Jan. 20, 1931.  L. F. MEUNIER  1,789,559
CHUCK
Filed Nov. 12, 1928
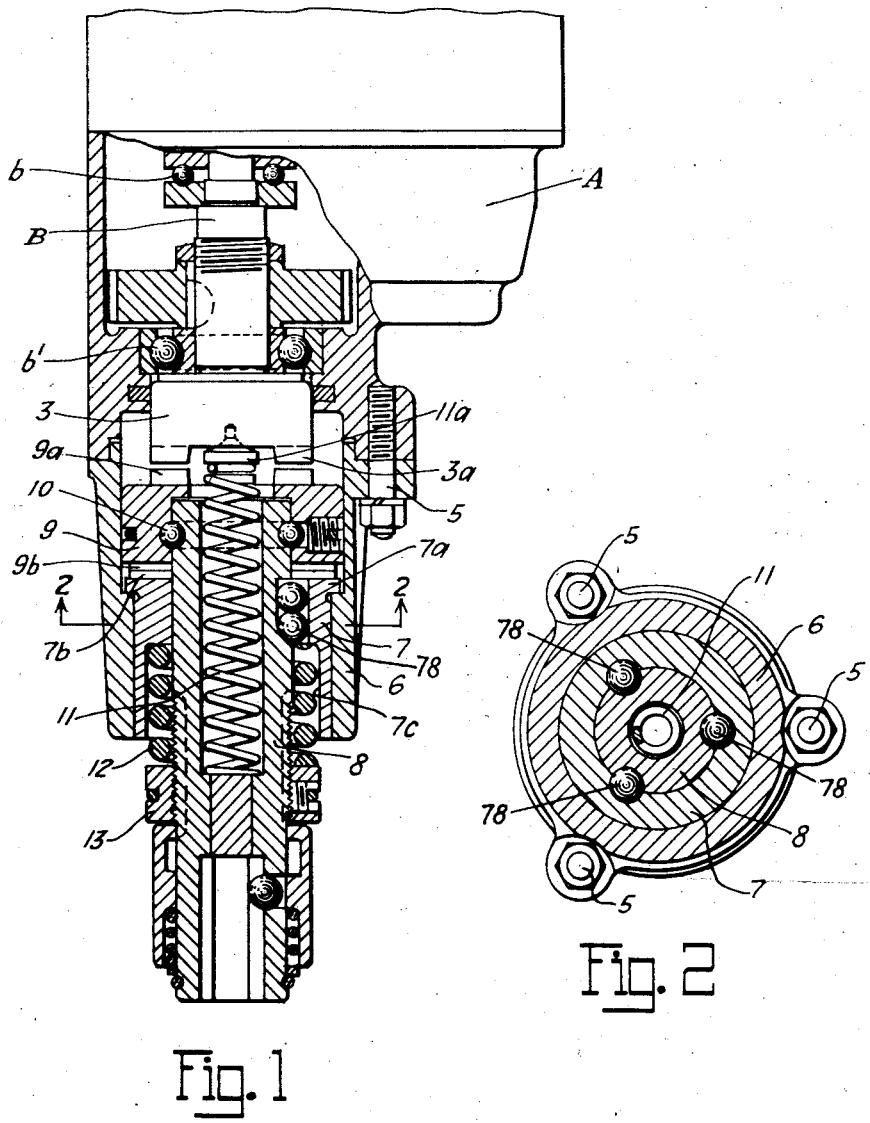
INVENTOR.
Leon F. Meunier
BY
Ira L. Nickerson
ATTORNEY.

Patented Jan. 20, 1931

1,789,559

UNITED STATES PATENT OFFICE

LEON F. MEUNIER, OF CLEVELAND, OHIO, ASSIGNOR TO CHICAGO PNEUMATIC TOOL COMPANY, OF NEW YORK, N. Y., A CORPORATION OF NEW JERSEY

CHUCK

Application filed November 12, 1928. Serial No. 318,635.

This invention relates to chucks generally, and more particularly to automatic releasing chucks for driving and setting up securing members of the threaded type such as screws, nuts, studs, and the like. While the invention has been developed for use on small portable power operated devices and tool, it is by no means restricted thereto, but has features of more general application and adaptation.

One object of the invention is to provide an improved device of the described type which will not transmit shock or reaction to the operator when a securing device is driven home. Another object is to make the chuck of rugged construction but very compact and of small overall dimensions. Another object is to provide for convenient adjustment so that a securing member may be set up to a predetermined degree of tightness. Other objects will be apparent from the detailed description which follows.

In order to illustrate the invention one concrete embodiment thereof is shown in the accompanying drawings in which:

Fig. 1 is a vertical sectional view through the chuck applied to a machine shown partly in section and partly in elevation, the rest being broken away; and Fig. 2 is a transverse sectional view substantially on the line 2—2 of Fig. 1.

In the drawing the machine to which the chuck is attached is indicated at A with its driving spindle shown at B. The machine may be of the stationary or portable type; if the latter the spindle is arranged to be driven either directly or through suitable gearing (not shown) by a prime mover (not shown), such as an electric or a fluid pressure motor, forming a part of the tool.

Spindle B, which is rotatably supported by bearings $b$ and $b'$ carries a clutch head 3, either integral with or rigidly secured to the spindle as desired. Clutch head 3 with clutch teeth $3a$ on its lower face is disposed in a recess formed in a flared portion of the machine casing and to this flared portion is rigidly secured by any suitable means, such as bolts 5, an annular or tubular extension or support 6 which forms a portion of the chuck proper. Support 6 is disposed coaxially with spindle B and has a differential bore, the inner portion of which forms a continuation of the recess or socket in which the clutch head 3 is disposed. An annular clutch member 7 is slidably and rotatably mounted in the reduced bore of support 6, a flange $7a$ being arranged to engage the shoulder between the differential portions of the bore to prevent clutch member 7 from being forced out of support 6. As shown, support 6 entirely encloses clutch member 7 when the latter is in its outermost position. Extending through the bore of clutch member 7 and slidably supported therein is a shaft 8, this shaft and member 7 being keyed against relative rotary movement by suitable means, such as balls 78, seated in registering grooves in the outer and inner portions respectively of these parts. Another clutch member 9 is rotatably mounted upon the inner end of shaft 8 but held against axial movement thereon by a connection comprising a series of balls 10 seated in registering annual grooves on the inner and outer portions respectively of these parts. Clutch member 9 is arranged to cooperate both with clutch member 3 and annular clutch member 7, having heavy teeth $9a$ to engage teeth $3a$ of member 3 and smaller teeth $9b$ to engage similar teeth $7b$ on member 7. A coil spring 11 seated in an axial bore in shaft 8 and having a centering point $11a$ engaging a recess in member 3 normally maintains shaft 8 together with clutch members 7 and 9 at the outward limit of their sliding movement in support 6.

Means are provided for normally maintaining clutch members 7 and 9 in engagement, such means being yielding and arranged for adjustment so that an automatic throw out clutch is provided. Such means preferably take the form of a coil spring 12 encircling shaft 8 below annular clutch member 7 and engage the latter on the one hand while being engaged on the other by an adustment nut 13. In order that the chuck may be short and compact, annular clutch member 7 has a deep undercut $7c$ in which the greater portion of spring 12 is housed. The lower end of shaft 8 carries suitable means for removably attaching the working tool (not shown), such as a screw driver bit, a nut socket, or the like.

In operation, application of the tool to the work and pressure thereon causes shaft 8 with its supporting clutch members 7 and 9 to slide inwardly within support 6 so that the teeth 9a and 3a of the main clutch are engaged, with the result that the rotative impulse of spindle B is transmitted to clutch member 9 whence it is transmitted in turn through engaging teeth 9b and 7b of the supplemental clutch to annular clutch member 7 and through the keying balls 78 to shaft 8. When the securing member is driven home or set up to the extent predetermined by the tension imparted to spring 12 by adjustment nut 13, teeth 7b and 9b ride upon one another after the manner indicated in Fig. 1, thus throwing out the supplemental clutch. By preference teeth 7b and 9b of the supplemental throw-out clutch are arranged so as to mesh only once or twice per rotation thereby giving a cushioned effect and reducing the jar and reaction of their engaging and disengaging until the tool is lifted from the work, whereupon spring 11 acts to disengage the main clutch 3a—9a.

From the above it will be apparent that shaft 8 has no direct contact with spindle B which drives it nor with the tubular member 6, since it is supported indirectly in the latter through clutch members 7 and 9, the former having an extended bearing in the reduced bore of the support and the latter an extended bearing in the inner or enlarged portion of the bore. The undercutting of the annular clutch member 7 to receive the greater portion of spring 12 permits a compact construction without sacrifice of any of the extended bearing surface in support 6 which is important in mechanism subjected to hard usage.

While a preferred form of the invention has been herein shown and described, it is to be understood that the invention is not limited to the specific details thereof, but covers all changes, modifications, and adaptations within the scope of the appended claims.

I claim as my invention:

1. The combination with a rotatable spindle having a clutch face, of a support, an annular clutch member rotatably supported by the latter in line with but in spaced relation to said clutch face, said support engaging the exterior of said member substantially throughout the length thereof and providing a bearing in which said member is rotatably supported, a shaft extending through said annular member, and another clutch member rotatably mounted upon said shaft between said annular clutch member and said clutch face of said spindle for cooperation with both.

2. The combination with a machine having a rotatable spindle with a clutch face, of a tubular support rigidly secured to said machine and projecting therefrom concentric with said spindle, said support having a differential bore, an annular clutch member having a differential extension fitting the bore of said support and rotatable therein in spaced relation to said clutch face, a shaft extending through said member and supported by the latter for sliding movement in an axial direction, and another clutch member rotatably mounted upon the inner end of said shaft for movement with the latter between said annular clutch member and said clutch face for cooperation with both.

3. The combination with a rotatable spindle having a clutch face, of a support, an annular clutch member rotatably supported by the latter in line with but in spaced relation to said clutch face, said support engaging the exterior of said member substantially throughout the length thereof and providing a bearing in which said member is rotatably supported, a shaft extending through said annular member, and another clutch member rotatably mounted upon said shaft between said annular clutch member and said clutch face of said spindle for cooperation with both, said shaft being without direct contact with said support or with the said spindle and being supported by the former solely through said clutch members.

4. The combination with a rotatable spindle having a clutch face, of a support, an annular clutch member rotatably supported by the latter in line with but in spaced relation to said clutch face, said support engaging the exterior of said member substantially throughout the length thereof and providing a bearing in which said member is rotatably supported, a shaft extending through said annular member, another clutch member secured to the inner end of said shaft but rotatable thereon, and adjustable means for yieldingly maintaining said clutch members normally in engagement, at least a portion of said means being within the axial extent of said support.

5. The combination with a rotatable spindle having a clutch face, of a support, an annular clutch member rotatably supported by the latter in line with but in spaced relation to said clutch face, said support engaging the exterior of said member substantially throughout the length thereof and providing a bearing in which said member is rotatably supported, a shaft extending through said annular member, another clutch member secured to the inner end of said shaft but rotatable thereon, and adjustable means for yieldingly maintaining said clutch members normally in engagement including a spring encircling said shaft, said annular clutch member having an undercut recess into which said spring extends whereby the latter is at least partly housed within the axial extent of said support.

Signed by me at Cleveland, county of Cuyahoga, and State of Ohio, this 5th day of November, 1928.

LEON F. MEUNIER.